United States Patent Office 2,833,821
Patented May 6, 1958

2,833,821

PREPARATION OF CALCIUM LYSINATE

Norman L. Hause, Grand Island, N. Y., assignor to E. I. du Pont de Nemours and Company, Wilmington, Del., a corporation of Delaware No Drawing. Application October 7, 1954
Serial No. 461,011

9 Claims. (Cl. 260—534)

This invention relates to calcium lysinate and to its preparation.

Calcium lysinate is useful as a solubilizing agent for acetylsalicylic acid. It is also useful for dietary purposes for supplying or supplementing both calcium and lysine requirements in the diet, for example, in cases of pregnancy or old age where requirements for these materials are high or effective utilization is poor. However, calcium lysinate has not been used commercially to any significant extent chiefly because no satisfactory method has been known for its preparation.

It is an object of the invention to provide a simple and practical method for preparing calcium lysinate. A further object is to provide a method whereby this compound can be readily obtained in a subtantially pure form well suited for dietary or other uses. Still further objects will be apparent from the following description.

The above objects are accomplished in accordance with the invention by dissolving calcium hydroxide in an aqueous solution of lysine and evaporating the resulting solution to leave a residue of the desired calcium lysinate. Preferably, any calcium hydroxide remaining undissolved is separated from the product solution prior to its evaporation.

The invention is illustrated by the following example, in which all parts are parts by weight.

*Example*

12 parts (0.16 mole) of calcium hydroxide was added to a solution of 46.2 parts of lysine (0.32 mole) in 53.8 parts of water at room temperature. Substantially all of the calcium hydroxide went into solution after simply stirring the mixture for a few minutes. A further 10 parts of calcium hydroxide was added, but most, if not all, of this remained undissolved and was removed by filtration. The filtrate was evaporated to dryness on a steam bath at a pressure of about 50–100 mm. Hg. The dried product, obtained in good yield, was then finely ground. A sample upon ignition left as residue an alkaline calcium compound, probably the oxide. A small portion of the product, after drying overnight over sodium hydroxide pellets in a vacuum desiccator and then for 3 hours over phosphorus pentoxide in a vacuum oven at 75° C., was analyzed for carbon and hydrogen.

Calc. for $C_{12}H_{26}O_4N_4Ca$: C, 43.57; H, 7.9. Found: C, 43.14; H, 7.74.

23.35 ml. of 0.1007 N HCl was required to neutralize a water solution of 0.1992 g. of the dried product to pH 5.15. Approximately 4 moles of HCl are, therefore required to neutralize one mole of product to the lysine monohydrochloride end point. Such a value is consistent with the structure:

Lime can be used in place of calcium hydroxide in practicing the invention since it is hydrated by the water to calcium hydroxide which then is dissolved by the lysine solution. However, calcium carbonate is not suitable for the present purpose. When calcium carbonate is slurried in a lysine solution and the excess calcium carbonate filtered off, the filtrate leaves no residue on ignition showing the absence of calcium ion in the lysine solution. In contrast, it has been found that lysine solutions dissolve amounts of calcium hydroxide corresponding to 0.5 mole of $Ca(OH)_2$ per mole of lysine in the solution. Thus, 100 g. of a 46.2% (by weight) solution of lysine rapidly dissolves approximately 11.7 g. of calcium hydroxide at about room temperature, while the normal solubility of calcium hydroxide in water is only about 0.1 g. per 100 g. of water. This ability of lysine solutions, which are quite strongly alkaline, to dissolve and react with calcium hydroxide is surprising particularly in view of the fact that such solutions will not dissolve calcium carbonate.

Normally, it will be desired to prepare substantially pure calcium lysinate and this requires employing at least 0.5 mole of calcium hydroxide per mole of lysine in the lysine solution used. An excess of the hydroxide, e. g. 1% to 50% excess corresponding to a mole ratio of $Ca(OH)_2$:lysine in the range of 0.505 to 1 to 0.75 to 1, will generally be employed to insure complete utilization of the lysine, which excess will then be removed, e. g. by filtration or centrifuging, before evaporation of the solution of calcium lysinate is effected if a product free of unreacted calcium hydroxide is desired. Still larger excesses of calcium hydroxide are operable but are not preferred for economic reasons. Less than 0.5 mole of calcium hydroxide per mole of lysine can be used but at least 0.5 mole and preferably 0.505 to 0.75 mole of the hydroxide should be used if a product substantially free of free lysine is desired.

Solution of the calcium hydroxide in the lysine solution occurs in a matter of minutes at room temperature, particularly when aided by agitation, as is desirable. Temperatures below and above room temperature, e. g. up to the boiling point of the solution, can be used. However, prolonged heating of the resulting solution at temperatures above about 75° C. is preferably avoided in order to minimize any tendency for lysine to decompose under those conditions. Heating for short intervals of time at temperatures above 75° C. can be tolerated, for example, when evaporating the product solution by flash vaporization methods, e. g. using a drum dryer. With ordinary vaporization methods, vaporization under reduced pressures at temperatures of 20 to 75° C. is preferred.

If the calcium lysinate product is intended for dietary uses, it will be preferred to employ in its preparation solutions of L-lysine which is the biologically active form of lysine. However, the present method can be practiced using any of the stereoisomers of lysine, including a mixture of the D- and L-isomers.

I claim:

1. The method of preparing calcium lysinate comprising dissolving calcium hydroxide in an alkaline aqueous solution of lysine, in which solution lysine is the sole solute, and recovering solid calcium lysinate by evaporating the resulting solution of calcium lysinate.

2. The method of preparing calcium lysinate comprising adding to an alkaline aqueous solution of lysine, in which solution lysine is the sole solute, at least 0.5 mole of calcium hydroxide per mole of lysine present in said solution, separating from the resulting solution any calcium hydroxide which remains undissolved, and recovering solid calcium lysinate by evaporating the resulting solution of calcium lysinate.

3. The method of preparing calcium lysinate comprising adding calcium hydroxide to an alkaline aqueous lysine solution, in which solution lysine is the sole solute, in an amount corresponding to 0.505 to 0.75 mole of said hydroxide per mole of lysine in said solution, separating from the solution the calcium hydroxide which remains undissolved, and recovering solid calcium lysinate by evaporating the resulting solution of calcium lysinate.

4. The method of preparing calcium lysinate comprising dissolving calcium hydroxide in an alkaline aqueous solution of lysine, in which solution lysine is the sole solute, and recovering solid calcium lysinate by evaporating the resulting solution of calcium lysinate at a temperature of 20 to 75° C.

5. The method of claim 4 wherein at least 0.5 mole of calcium hydroxide is used per mole of lysine in the starting solution and any calcium hydroxide remaining undissolved is removed from the resulting solution of calcium lysinate before evaporating the latter.

6. The method of claim 5 using from 0.505 to 0.75 mole of calcium hydroxide per mole of lysine.

7. The method of claim 1 employing L-lysine.
8. The method of claim 2 employing L-lysine.
9. The method of claim 3 employing L-lysine.

References Cited in the file of this patent

F. W. Foreman: Biochem. J., 1914, 8, 463, 481.
G. R. Tristam: Biochem. J., 1939, 33, 1271.
K. Bailey et al.: Biochem. J., 1943, 37, 360.